(12) United States Patent
Bolshtyansky (10) Patent No.: US 10,374,725 B2
(45) Date of Patent: Aug. 6, 2019

(54) POWER DELIVERY IN SUBMARINE OPTICAL COMMUNICATION SYSTEMS USING POWER FEED CONVERTERS

(71) Applicant: SubCom, LLC, Eatontown, NJ (US)

(72) Inventor: Maxim A. Bolshtyansky, Millstone, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 15/724,844

(22) Filed: Oct. 4, 2017

(65) Prior Publication Data
US 2019/0103923 A1  Apr. 4, 2019

(51) Int. Cl.
*H04B 10/00* (2013.01)
*H04B 10/80* (2013.01)
*H04B 10/25* (2013.01)

(52) U.S. Cl.
CPC ......... *H04B 10/80* (2013.01); *H04B 10/2504* (2013.01)

(58) Field of Classification Search
CPC .... H04B 10/80; H04B 10/29; H04B 10/0777; H04B 10/0771; H04B 10/07955; H04B 10/2918; H04B 10/0797

USPC ....... 398/104, 105, 173, 175, 176, 177, 160, 398/179, 181, 158, 159, 33, 34, 37, 38

See application file for complete search history.

(56) References Cited

U.S. PATENT DOCUMENTS

| | | | |
|---|---|---|---|
| 5,719,693 A * | 2/1998 | Tanoue | H04B 10/29 398/105 |
| 2002/0196505 A1* | 12/2002 | Cordier | H04B 10/806 398/147 |
| 2010/0092178 A1* | 4/2010 | Liu | H04B 10/0771 398/105 |
| 2013/0202285 A1* | 8/2013 | Lecroart | H04B 3/44 398/1 |

\* cited by examiner

*Primary Examiner* — Hanh Phan (57) ABSTRACT

A submarine optical communication system using one or more power feed converters for power delivery to repeaters. Power feed equipment located one or more a landmasses is coupled to a power conductor of an optical cable for powering repeaters coupled to cable. One or more power feed converter(s) are coupled to the power conductor for converting current from power feed equipment to a constant output current or voltage for powering other repeaters coupled to the cable. Embodiments are robust to shunts of the power conductor.

19 Claims, 7 Drawing Sheets

POWER DELIVERY IN SUBMARINE OPTICAL COMMUNICATION SYSTEMS USING POWER FEED CONVERTERS

TECHNICAL FIELD

The present disclosure relates to optical communication systems and, more particularly, to power delivery in submarine optical communication systems using power feed converters.

BACKGROUND

To maximize the transmission capacity of an optical communication system, a single optical fiber may be used to carry multiple optical signals in what is called a wavelength division multiplexed system (hereinafter a WDM system). The multiple optical signals may be multiplexed to form an aggregate multiplexed signal or WDM signal with each of the multiple signals being modulated on separate wavelengths referred to as channels. Modern WDM systems have a high traffic capacity, for example, a capacity to carry 100 or more channels at 100 gigabits per second (hereinafter Gb/s) per channel, or more.

A WDM optical transmission system may include a transmitting terminal coupled to a receiving terminal through a relatively long link, e.g. a trunk or branch path, established by one or more segments of optical cable. Some systems, such as long-haul submarine systems, may have a length between terminals of thousands of kilometers and span large bodies of water (e.g. oceans). The terminals may be provided in cable stations that are separated by the body of water, and the cable is typically laid across the floor of the water body, e.g. the ocean floor. The optical cable includes one or more layers of insulation or armor, one or more power conductors, and a number of optical fibers for carrying WDM signals. At each end, the cable extends out of the water onto land, and eventually into a cable station.

At the cable station, the optical fibers in the cable are coupled to communication equipment capable of transmitting and/or receiving various signals between the terminals. Signals carried by the cable are received from originating destinations, and/or transmitted to final destinations, by land-based communication networks. The power conductor of the cable is coupled to power feed equipment at one or both cable stations for delivering power to repeaters coupled to the cable.

Increasingly subsea optical communication systems are limited by the ability to deliver power to subsea repeaters via a cable. When voltage is applied by power feed equipment at a cable station, the maximum voltage is at the cable station and voltage is gradually reduced as current flows along the cables and power is used in repeaters to amplify the optical signals. The maximum ability to power a link is thus limited by the maximum voltage that can be applied to the power conductor of the cable, i.e. the maximum cable voltage.

BRIEF DESCRIPTION OF THE DRAWINGS

Reference should be made to the following detailed description which should be read in conjunction with the following figures, wherein like numerals represent like parts.

DETAILED DESCRIPTION

In general, a system and method consistent with the present disclosure alleviates power delivery limitations associated with known systems through use of one or more power feed converters coupled to the cable. Each power feed converter (PFC) may be configured as a voltage or current converter and is positioned in the optical link to improve power delivery. The improved power delivery may be used to increase the length of the link, increase available power for each repeater, thus increasing system capacity, or may facilitate use of a higher resistance and less expensive cable, e.g. without a reduction in power used in each repeater. Combinations of these advantages may be achieved. For example, the improved power delivery may be utilized to increase system length and increase available power for each repeater. Embodiments consistent with the present disclosure are also tolerant to shunts along the length of the link.

Figure 1:
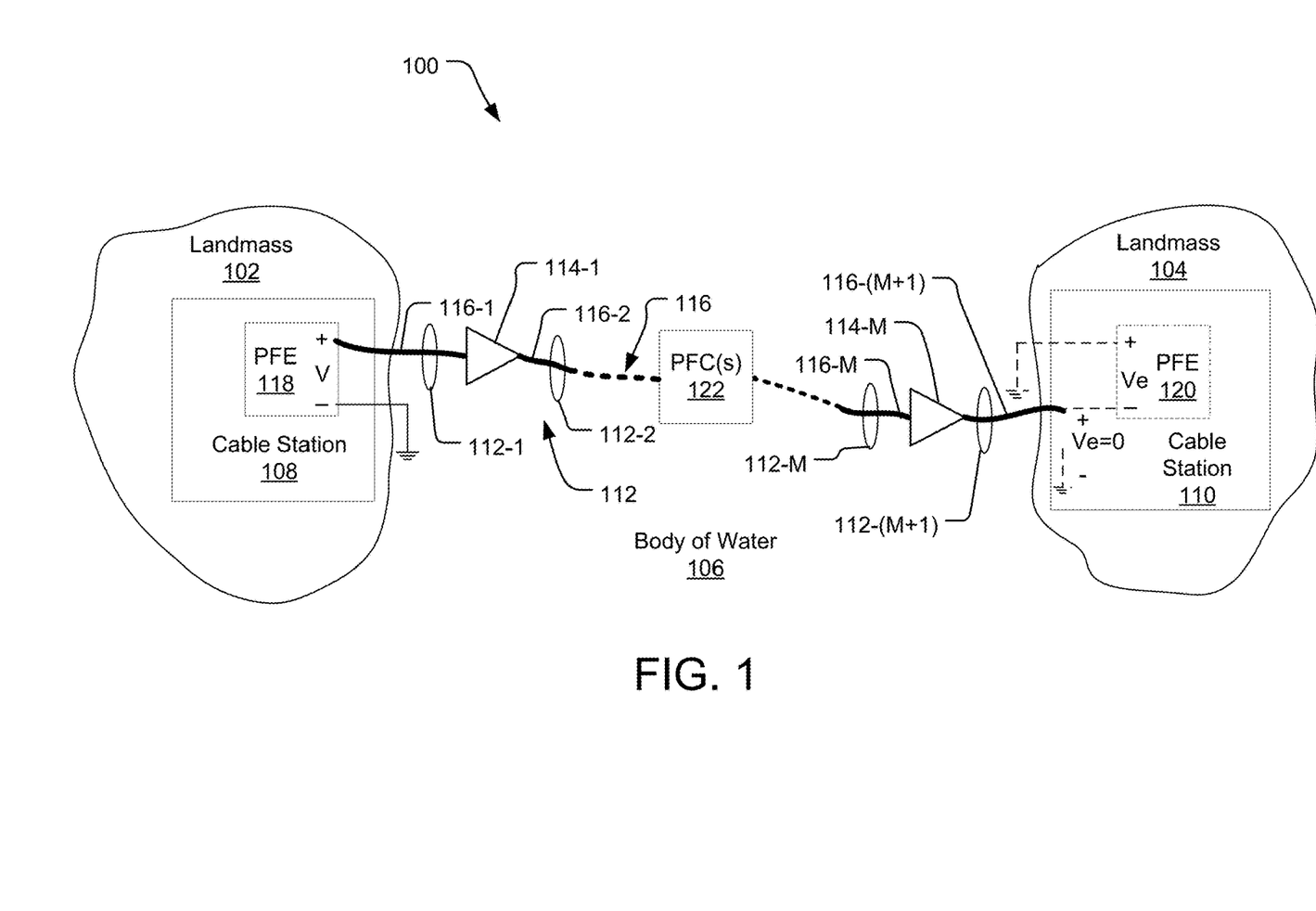
FIG. 1 diagrammatically illustrates an embodiment of a system consistent with the present disclosure.

FIG. 1 is a simplified diagram of a system 100 consistent with the present disclosure. In FIG. 1, first 102 and second 104 landmasses, e.g. an island, continent, etc. separated by a body of water 106 (sea, ocean, etc.). The first 102 and second 104 land masses include associated cable stations 108, 110 coupled by an optical cable 112. The cable 112 is not a continuous, uninterrupted cable, but instead is comprised of a number of smaller cable segments 112-1, 112-2 . . . 112-M, 112-(M+1) operatively coupled to each other with optical repeaters 114-1 . . . 114-M and one or more power feed converters (PFCs) 122 connected in between. For simplicity and ease of explanation however, the entire link between the first 102 and second 104 landmass is referred to herein as a "cable." Also, although the illustrated embodiment shows the cable 112 extending between first 102 and second 104 landmasses, it is to be understood a system consistent with the present disclosure may also be used to establish a link between a branching unit and a landmass, between more than two landmasses, etc.

The optical cable 112 includes a plurality of optical fibers for carrying optical signals, e.g. WDM signals, between the landmasses 102, 104 using known equipment and techniques. The optical signals carried by the optical fibers may be coupled to communication networks on the first 102 and second 104 landmasses. For simplicity and ease of explanation, the optical fibers of the cables and the communication networks are not shown herein.

The optical cable 112 also includes a power conductor 116. The power conductor is not a continuous, uninterrupted conductor, but instead is comprised of a number of smaller conductor segments 116-1, 116-2 . . . 116-M, 116-(M+1) that are electrically coupled to each other with the optical repeaters 114-1 . . . 114-M and one or more power feed converters (PFCs) 116 electrically coupled in between. For simplicity and ease of explanation however, entire electrical path between the first and second landmass is referred herein to as a "power conductor."

At the first landmass 102, the power conductor 116 of the cable 112 is connected to a positive terminal of power feed equipment (PFE) 118 in the cable station 108. The PFE 118 may be of any commercially available type that is suitable to power devices that may be located along the length of the cable 112. The negative terminal of the PFE 118 may be connected to a ground, such as the ocean itself. The PFE 118 applies a voltage V to the power conductor 116. The voltage V cannot exceed the maximum cable voltage, which is the voltage above which damage to the cable 112 and/or components coupled thereto would occur.

From the cable station 108, the cable 112 extends out of the landmass 102, into the body of water 106 and eventually to the second landmass 104 where the cable 112 extends out of the body of water 106 and into the second cable station 110. At the second station, the power conductor 116 of the cable 112 may be connected to a ground so that the sum of the voltage drops along the power conductor 116 from the cable station 108 to the cable station 110 leads to a voltage Ve at the end of the cable 112 of zero. This configuration is sometimes referred to as a single-end feed configuration, since power is supplied by PFE 118 at only one end of the cable 112. Alternatively, the power conductor 116 of the cable 112 may be connected to a negative terminal of PFE 120 at the cable station 110. The positive terminal of the PFE 120 may be connected to a ground to apply a negative voltage Ve at the end of cable 112 at the cable station 110. This configuration is sometimes referred to as a dual-end feed configuration, since power is supplied by PFE 118, 120 at both ends of the cable 112.

In the single-end feed configuration of FIG. 1, the PFC(s) 122 are coupled to the power conductor 116 of the cable 112 and positioned to improve power delivery compared to a system without PFCs 122. In general a PFC may be any known device or combination of devices configured to receive an input voltage and current and provide a desired constant output current or constant output voltage. A variety of high-voltage DC-DC converter configurations useful as a PFC are known. For example, in a system with a single PFC 122, the PFC 122 may be positioned on the cable 112 so that the voltage and current at the input to the PFC 122 produces a voltage output of the PFC that will drive the repeaters between the PFC 122 and the second landmass 104 and result in a voltage Ve at the end of the cable 112 of nominally zero.

Figure 2:
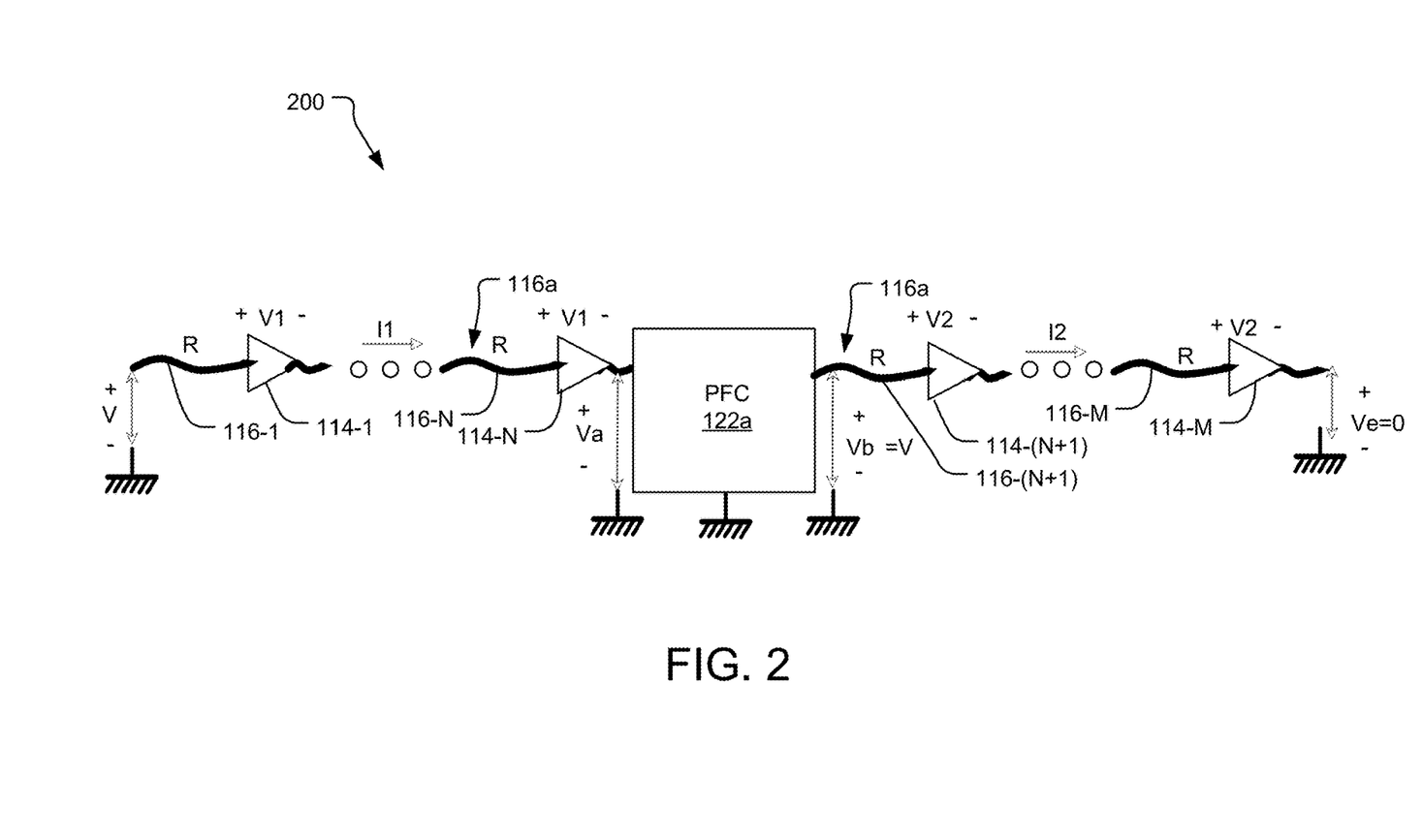
FIG. 2 diagrammatically illustrates an embodiment of a system consistent with the present disclosure using a single-end feed power delivery configuration.

FIG. 2 diagrammatically illustrates one embodiment 200 of a single-end feed power delivery configuration consistent with the present disclosure. For simplicity and ease of explanation, illustrations of embodiments herein may show only the power conductor 116 of an optical cable and may not show landmasses, cable stations, etc. It is to be understood however that in the illustrated embodiments power is supplied to a power conductor 116 of an optical cable 112 that is within a body of water 106 and extends to one (in the case of a branching path) or two land masses, possibly with one or more intermediate landmasses. The optical cable 112 includes optical fibers for carrying optical signals to and from landmasses.

In the illustrated embodiment 200 the power conductor 116a includes power conductor segments 116-1 . . . 116-N, 116-N+1 . . . 116-M with repeaters 114-1 . . . 114-N, 114-N+1 . . . 114-M and a PFC 122a electrically coupled thereto. For ease of explanation, the repeaters 114-1 . . . 114-N, 114-N+1 . . . 114-M will be described herein as each having same configuration and electrical characteristics, and the power conductor segments 116-1 . . . 116-N, 116-N+1 . . . 116-M will be described herein has having the same length and electrical resistance R. It is to be understood, however, that a system consistent with the present disclosure may include repeaters having different configurations and electrical characteristics and power conductor segments of different lengths and resistance.

Each repeater 114-1 . . . 114-N, 114-N+1 . . . 114-M and the power conductor segment 116-1 . . . 116-N, 116-N+1 . . . 116-M coupled to the input to the repeater 114-1 . . . 114-N, 114-N+1 . . . 114-M may be described as a span. The embodiment shown in FIG. 2 includes M spans, with N spans shown to the left of the PFC 122a and M-N spans shown to the right of the PFC 122a. An input voltage of V to the power conductor 116a establishes a current I1 in the spans to the left of the PFC 122a and at the input to the PFC 122a. The resistance R of the power conductor segments 116-1 . . . 116-N to the left of the PFC 122a and the voltage drop V1 across each repeater 114-1 . . . 114-N to the left of the PFC 122a results in a voltage drop associated with each span to the left of the PFC 122a of (I1R+V1). Assuming the resistance of the power conductor segment between the PFC 122a and the last repeater 114-N is minimal, the total voltage drop to the left of the PFC 122a in FIG. 2 is (I1R+V1)×N and the input voltage Va to the PFC 122a is V−(I1R+V1)×N.

In the illustrated embodiment, the PFC 122a is configured to receive input current I1 and voltage Va and provide an output current I2 and an output voltage Vb=V. To power all the repeaters 114-1 . . . 114-N, 114-N+1 . . . 114-M, the target power P for the repeaters 114-1 . . . 114-N on the left side of the PFC 122a and the target power P for the repeaters 114-N+1 . . . 114-M on right side of the PFC 122a may be same such that P=V1×I1=V2×I2. The PFC 122a has a conversion efficiency C such that C×I1×Va=I2×V, and I1 is always larger than I2. The resistance R of each power conductor segment 116-N+1 . . . 116-M to the right of the PFC 122a and the voltage drop V2 across each repeater 114-N+1 . . . 114-M to the right of the PFC 122a results in a voltage drop associated with each span to the right of the PFC 122a of (I2R+V2). Assuming the resistance of last power conductor segment at the output of the repeater 114-M is minimal, the total voltage drop to the right of the PFC 122a in FIG. 2 is (I2R+V2)×(M−N) and the voltage at the end of the power conductor 116a is Ve=0=(I2R+V2)×(M−N).

With the above relationships the number of spans M may be maximized using the variables C, I1, I2, P, R and V. Calculating M numerically and using a conversion efficiency C=1 gives a value of M when using a PFC 122a as shown in FIG. 2 of:

$$M\text{converter}=0.73(V\sqrt{P R})$$

For a conventional system without a PFC consistent with the present disclosure, M is given by:

$$M\text{conventional}=0.5(V\sqrt{P R})$$

This provides a maximum extension ratio Mr of:

Mr=Mconverter/Mconventional=1.46

Figure 3:
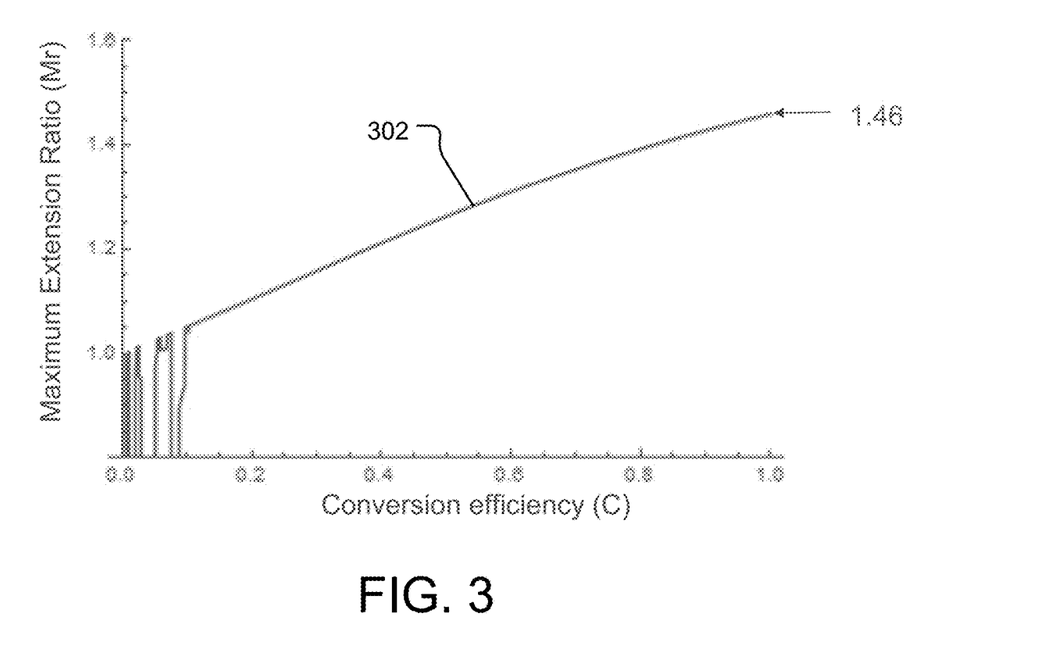
FIG. 3 includes a plot of maximum extension ratio (Mr) vs. conversion efficiency (C) for a system consistent with the present disclosure.

Advantageously, the value of Mr=1.46 indicates that compared to a conventional system a system with a PFC 122a consistent with the present disclosure can be configured to be 1.46 times longer, have a 1.46 times smaller input voltage V, have 2.1 (1.46$^2$) times greater available power per repeater 114-1 . . . 114-N, 114-N+1 . . . 114-M leading to greater capacity or have a 2.1 times higher cable resistance R. These advantages decrease with decreasing conversion efficiency C for the PFC 122a, but any positive conversion efficiency C has benefit. FIG. 3, for example, includes a numerically calculated plot 302 of the maximum extension ratio Mr versus conversion efficiency C of the PFC 122a for a system as shown in FIG. 2. Plot 302 of FIG. 3 shows that for values of C between about 0.65 and 0.95 the maximum extension ratio has values between about 1.35 and 1.45.

Figure 4:
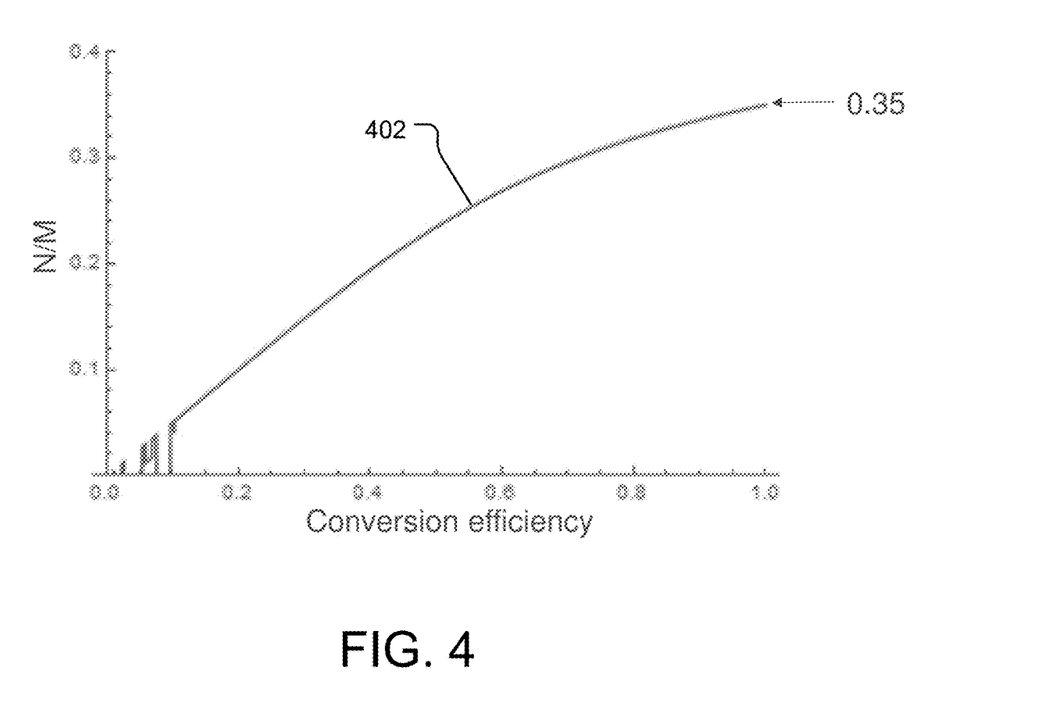
FIG. 4 includes a plot of the ratio of the number of spans between power feed equipment and a power feed converter and the total number of spans (N/M) vs. conversion efficiency (C) for a system consistent with the present disclosure.

The optimal location of the PFC 122a may be considered as the ratio of the number N of spans to the left of the PFC 122a to the number of spans M, i.e. N/M. FIG. 4, for example, includes a numerically calculated plot 402 of the N/M versus conversion efficiency C of the PFC 122a for a system as shown in FIG. 2. Plot 402 of FIG. 4 shows that for values of C between about 0.65 and 0.95 the PFC 122a should be placed between 0.3 and 0.35 of the total length power conductor from the power feed equipment, i.e. from the left end in FIG. 2. In other words, the ratio of N/M for C values between about 0.65 and 0.95 should be between 0.3 and 0.35.

Figure 5A:
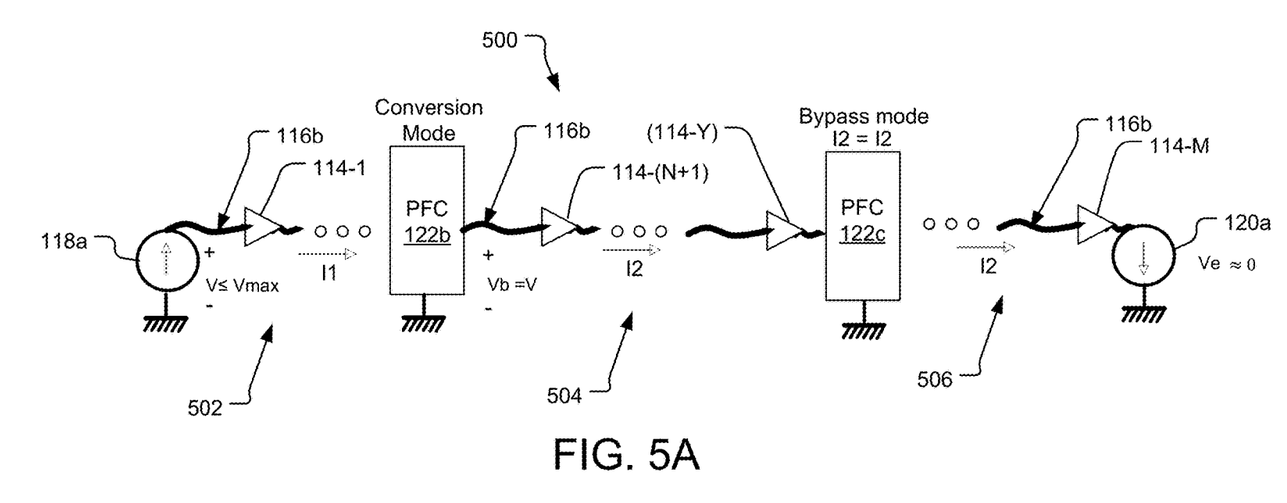
FIG. 5A diagrammatically illustrates an embodiment of a system consistent with the present disclosure using a dual-end feed power delivery configuration.

FIG. 5A diagrammatically illustrates an embodiment 500 of a dual-end feed power delivery configuration consistent with the present disclosure using two PFCs 122b, 122c coupled to a power conductor 116b. Using two PFCs 122b, 122c in a dual-end feed configuration provides robustness to faults resulting from shunting of the system power conductor 116b.

In the illustrated embodiment, the PFCs 122b and 122c define three sections 502, 504, 506 of the power conductor 116b. Repeaters 114-1 . . . 114-N+1 . . . 114-Y . . . 114-M are electrically coupled to the power conductor 116b. For ease of explanation, the repeaters 114-1 . . . 114-N+1 . . . 114-Y . . . 114-M are described herein as each having same configuration and electrical characteristics, and the power conductor segments coupled thereto will be described herein has having the same length and electrical resistance R. It is to be understood, however, that a system consistent with the present disclosure may include repeaters having different configurations and electrical characteristics and power conductor segments of different lengths and resistance.

The embodiment shown in FIG. 5A includes M spans, with N spans shown in section 502, Y-N spans in section 504, and M-Y spans in section 506. PFE 118a is coupled to the power conductor 116b to the left of PFC 122b and PFE 120a is coupled to power conductor 116b to the right of PFC 122c. The PFE 118a and 120a are configured as constant current sources.

The location of the PFC 122b relative to the number M of spans may be as shown and described in connection with FIG. 4, i.e. for conversion efficiency C values of PFC 122b between about 0.65 and 0.95 the PFC 122b should be placed between 0.3 and 0.35 of the total length power conductor 116b from the power feed equipment 118a (i.e. a ratio of N/M between 0.3 and 0.35). The location of the PFC 122c relative to the number M of spans may also be as shown and described in connection with FIG. 4, except the PFC 122c should be located from the power feed equipment 120a. For example, for conversion efficiency C values of PFC 122c between about 0.65 and 0.95 the PFC 122c should be placed between 0.3 and 0.35 of the total length power conductor 116b from the power feed equipment 120a (i.e. a ratio of (M-Y)/M between 0.3 and 0.35).

FIG. 5A illustrates normal operation of the system 500, i.e. without any shunts. As shown, the PFE 118a establishes a constant current I1 in the first section 502 of the power conductor 116b and an input voltage V≤Vmax. The current I1 is set to power all the repeaters in the first section 502.

The PFC 122b operates in a conversion mode. In conversion mode a PFC consistent with the present disclosure receives an input current and voltage and provides a predetermined output voltage or current. In the illustrated embodiment, the PFC 122b is configured to receive input current I1 and provide a constant output current I2 and an output voltage Vb=V. The current I2 is set to power all the repeaters in the second section 504, and, in normal operation, the PFC 122c operates in a bypass mode so the output current of PFC 122c is the same as its input current, i.e. I2. In bypass mode a PFC consistent with the present disclosure simply passes current through to its output without any conversion.

Conversion mode or bypass mode for a PFC 122b, 122c may be set depending on current to/from the PFC and/or by a control signal provided on a supervisory channel. In the illustrated embodiment, for example, the PFC 122b may be configured to enter a conversion mode in normal operation when input current to the PFC 122b from section 502 is I1, and to enter a bypass mode when input current to the PFC 122b from section 502 drops below I1, e.g. as a result of a shunt in section 502. The PFC 122c may be configured to enter a bypass mode when input current to the PFC from section 504 is I2, and to enter a conversion mode when input current to the PFC from section 504 drops below I2.

With PFC 122c in bypass mode, the system 500 operates in a manner similar to operation of the system 200 shown in FIG. 2. In normal operation the PFE 120a does not source current to the power conductor 116b. The current I2 produces voltage drops along the power conductor 116b to provide an output voltage Ve at the end of the power conductor 116b of approximately zero.

Figure 5B:
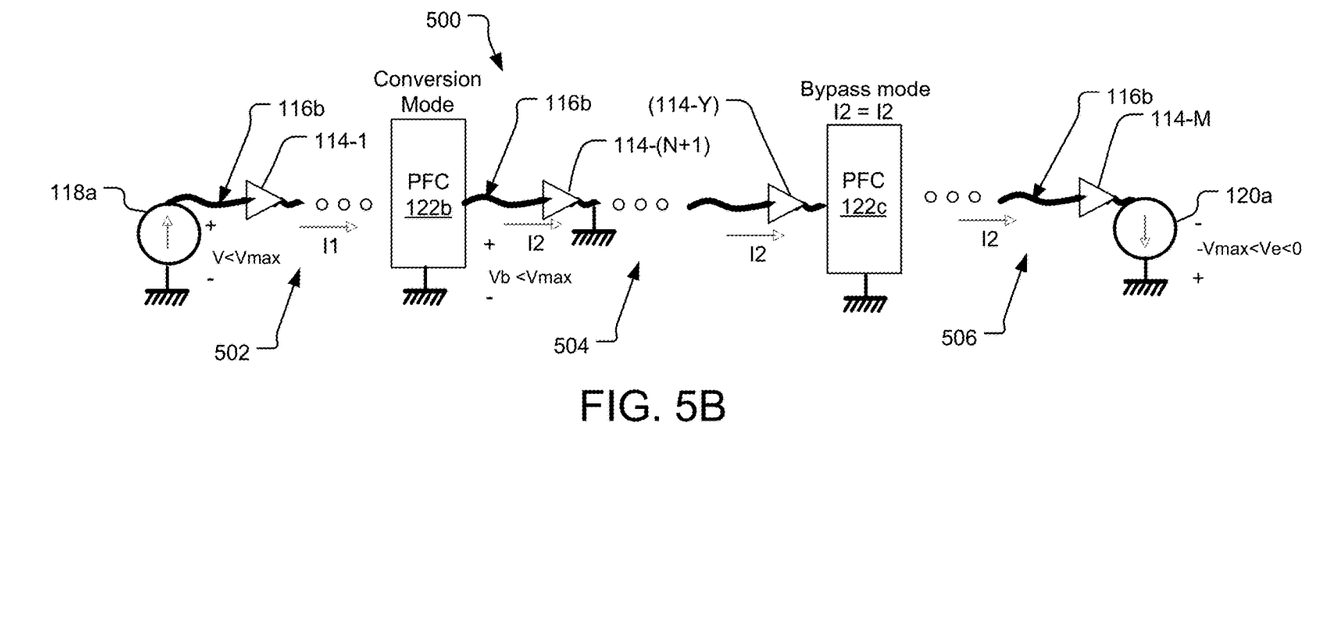
FIGS. 5B-5C diagrammatically illustrate operation of the embodiment shown in FIG. 5A with shunts in different locations.

FIG. 5B illustrates operation of the system 500 in the event of shunt in the second section 504 or in the third section 506. In the illustrated embodiment, the shunt is shown in the second section 504 at the output of the repeater 114-(N+1). Operation of the system 500 would be essentially the same as described in connection with FIG. 5B if the shunt were in the third section 506.

As shown, upon occurrence of a shunt in the second section 504, operation of the system to the left of the shunt continues as in normal operation of the system. In particular, the PFE118a establishes a current I1 in the first section 502 of the power conductor 116b and an input voltage V<Vmax. The current I1 is set to power all the repeaters to the left side of PFC 122b.

It is to be understood that references to a voltage, e.g. voltage V or Ve, in illustrated embodiments herein does not necessarily indicate that the voltage has the same value in each of the separate figures. Indeed, the PFE, e.g. PFE 118a and 120a will adjust, the output voltage as necessary (but not exceeding an absolute value of Vmax) to achieve the required constant current output. As such, the input voltage values will vary depending on system configuration and the fault location.

The PFC 122b is in conversion mode configured to receive input current I1 and provide a constant output current I2. Since the PFC 122b establishes a constant output current I2 and there is a shunt in the second section 504, the voltage Vb at the output of the PFC 122b is less than Vmax. The current I2, however, is sufficient to power the repeaters between the shunt and the PFC 122b, i.e. repeater 114-(N+1).

In the illustrated embodiment, in response to a shunt in section 504 or 506 the PFE 120a enters a current source mode. The PFE 120a may be configured to enter current source mode, for example, in response to sensing a drop in input current from the third section 506 to below I2. In the current source mode, the PFE 120a establishes voltage Ve between 0V and −Vmax and a constant current I2 in the third section 506 and in the portion of the second section 504 between the shunt and the PFC 122c. The current I2 is set to power all the repeaters in the third section 506 and between the shunt and the PFC 122c in the section 504. The PFC 122c is in bypass mode.

Figure 5C:
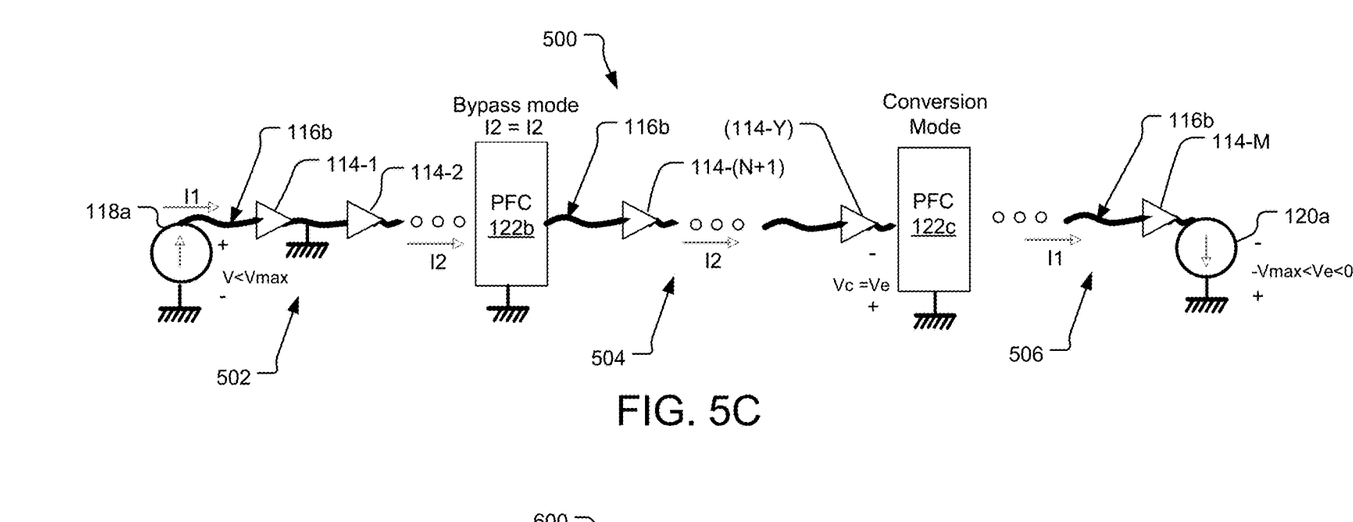

FIG. 5C illustrates operation of the system 500 in the event of shunt in the first section 502, i.e. between repeaters 114-1 and 114-2 in the illustrated embodiment. As shown, upon occurrence of a shunt in the first section 502, operation of the system to the left of the shunt continues as in normal operation of the system. In particular, the PFE 118a establishes a constant current I1 in the first section 502 of the power conductor 116b and an input voltage V≤Vmax. The current I1 is set to power all the repeaters up to the location of the shunt, i.e. repeater 114-1 in the illustrated embodiment.

In the embodiment shown in FIG. 5C, the PFE120a senses a drop in input current from the third section 506 to below I2 and enters a current source mode. In attempting to establish a voltage Ve between 0V and −Vmax and a constant current I2 in the third section 506, the second section 504 and the portion of the first section between the shunt and the PFC 122b with the PFC 122c in conversion mode, the voltage Ve at PFE 120a may exceed the maximum cable voltage Vmax. In response to the voltage Ve approaching Vmax, the PFE 120a may switch to a second current source mode, whereby the PFE 120a establishes a constant current I1 in the third section 506 of the power conductor 116b and a voltage −Vmax<Ve<0.

The current I1 is set to power all the repeaters in the third section 506. The PFC 122c is in conversion mode and configured to receive input current I1 and provide a voltage Vc=Ve at the output of the PFC 122c and constant output current I2 in the second section 504 and in the first section 502 between the shunt and the PFC 122b. The PFC 122b is in bypass mode. The current I2 is sufficient to power the repeaters to the in the second section 504 and in the first section between the shunt and the PFC 122b. In the illustrated embodiment, the repeaters in the first section 502 between the shunt and the PFC 122b, which operate using I1 in FIGS. 5A and 5B are configured to operate using I2 in the case of a shunt in the first section 502 as shown in FIG. 5C. Also, the repeaters in the third section 506, which operate using I2 in FIGS. 5A and 5B are configured to operate using I1 in the case of a shunt in the first section 502 as shown in FIG. 5C.

Advantageously, the system 500 illustrated in FIGS. 5A-5C is robust to shunts of the power conductor 116b occurring anywhere along the length of the power conductor 116b. Upon occurrence of a shunt, the PFE 118a and/or 120a establishes a constant current in the power conductor 116b and one of the PFCs 122b or 122c operates in conversion mode while the other of the PFCs operate in a bypass mode. As a result, all the repeaters coupled to the power conductor are powered by PFE 118a or PFE 120a in the event of a shunt of the power conductor 116b.

It is to be understood that although the embodiment shown in FIGS. 5A-5C operate using power supplied by PFE 118a in normal operation (without a shunt), a system consistent with the present disclosure could be configured as shown in FIGS. 5A-5C with power supplied by PFE 120a in normal operation. Operation of such an embodiment would involve a reversal of the roles described above for the PFE 118a, 120a and the PFCs 122b, 122c.

FIGS. 6A-6D diagrammatically illustrate operation of another embodiment 600 of a dual-end feed power delivery configuration consistent with the present disclosure. The embodiment 600 includes PFCs 122b, 122c, a power conductor 116b and repeaters 114-1 . . . 114-N+1 . . . 114-Y . . . 114-M configured and positioned as described in connection with FIGS. 5A-5C. The embodiment 600 includes PFE 118b coupled to the power conductor to the left of PFC 122b and PFE 120b coupled to the power conductor 116b to the right of PFC 122c. The PFE 118a and 120a are configured as constant current sources and are both in a current source mode during normal operation and upon occurrence of a shunt.

Figure 6A:
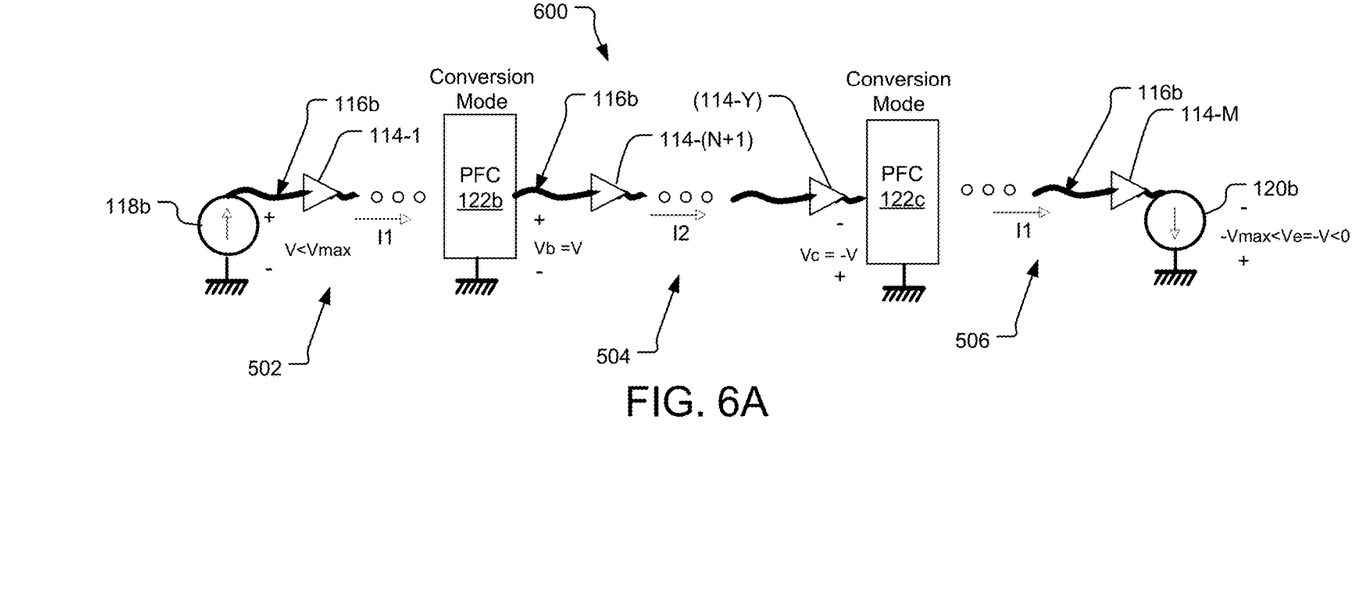
FIG. 6A diagrammatically illustrates another embodiment of a system consistent with the present disclosure using a dual-end feed power delivery configuration.

FIG. 6A illustrates normal operation of the system 600, i.e. without any shunts. As shown, the PFE118b establishes a constant current I1 in the first section 502 of the power conductor 116b and an input voltage V<Vmax. The current I1 is set to power all the repeaters in the first section 502. The PFC 122b is in conversion mode and is configured to receive input current I1 and provide a constant output current I2 and an output voltage Vb=V. The current I2 from the PFC 122b is set to power a portion of the repeaters in the second section 504.

The PFE120b establishes a constant current I1 in the third section 506 of the power conductor 116b and an input voltage Ve=−V. The current I1 is set to power all the repeaters in the third section 506. The PFC 122c is in conversion mode and is configured to receive input current I1 from the third section 506 and provide a constant current I2 in the second section 504. The current I2 from the PFC 122c is set to power the remaining repeaters in the second section that are not powered by the current I2 from the PFC 122b. Somewhere in the second section 504, the voltage drops associated with I2 form PFC 122b and from PFC 122c lead to a voltage on the power conductor of zero volts. Thus in normal operation of the illustrated embodiment, the PFE 118b and PFC 122b power all repeaters to the left of a zero voltage point on the power conductor 116b and the PFE 120b and PFC 122c power all repeaters to the right of the zero voltage point on the power conductor 116b.

Figure 6B:
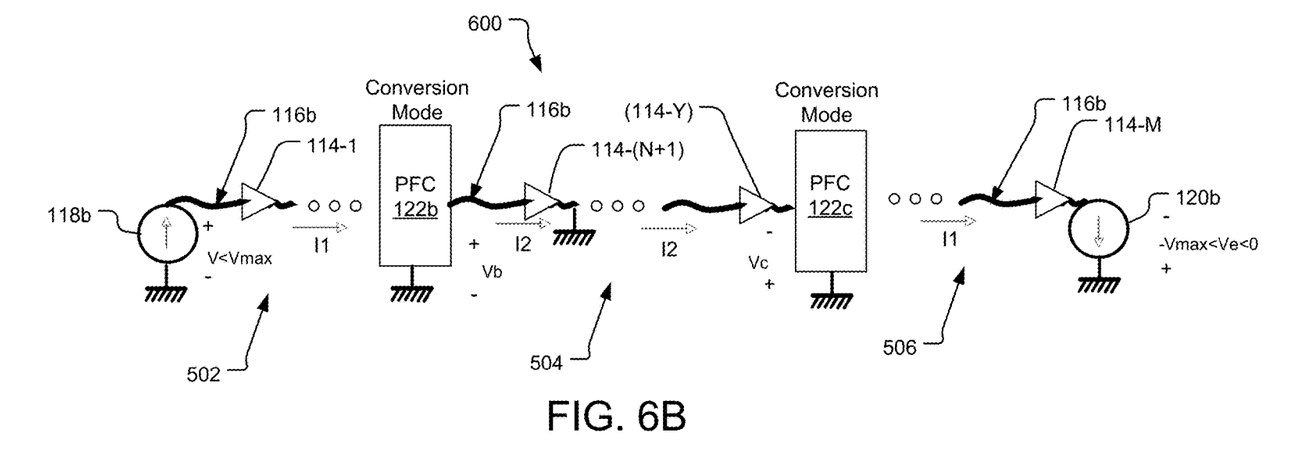
FIGS. 6B-6D diagrammatically illustrate operation of the embodiment shown in FIG. 6A with shunts in different locations.

FIG. 6B illustrates operation of the system 600 in the event of shunt in the second section 504. In the illustrated embodiment, the shunt is shown in the second section 504 at the output of the repeater 114-(N+1).

As shown, upon occurrence of a shunt in the second section 504, operation of the system to the left of the shunt continues as in normal operation of the system. In particular, the PFE118b establishes a constant current I1 in the first section 502 of the power conductor 116b and an input voltage V<Vmax. The current I1 is set to power all the repeaters in the first section 502. The PFC 122b is in conversion mode and is configured to receive input current I1 and provide a constant output current I2 and an output voltage Vb. The current I2 from the PFC 122b is set to power the repeaters in the second section 503 between the PFC 122b and the shunt, i.e. repeater 114-(N+1) in the illustrated embodiment.

The PFE 120*b* establishes a constant current I1 in the third section 506 of the power conductor 116*b* and an input voltage −Vmax≤Ve. The current I1 is set to power all the repeaters in the third section 506. The PFC 122*c* is in conversion mode and is configured to receive input current I1 from the third section 506 and provide a constant current I2 in the second section 504. The current I2 from the PFC 122*c* is set to power repeaters in the second section 504 between the shunt and the PFC 122*c*.

Figure 6C:
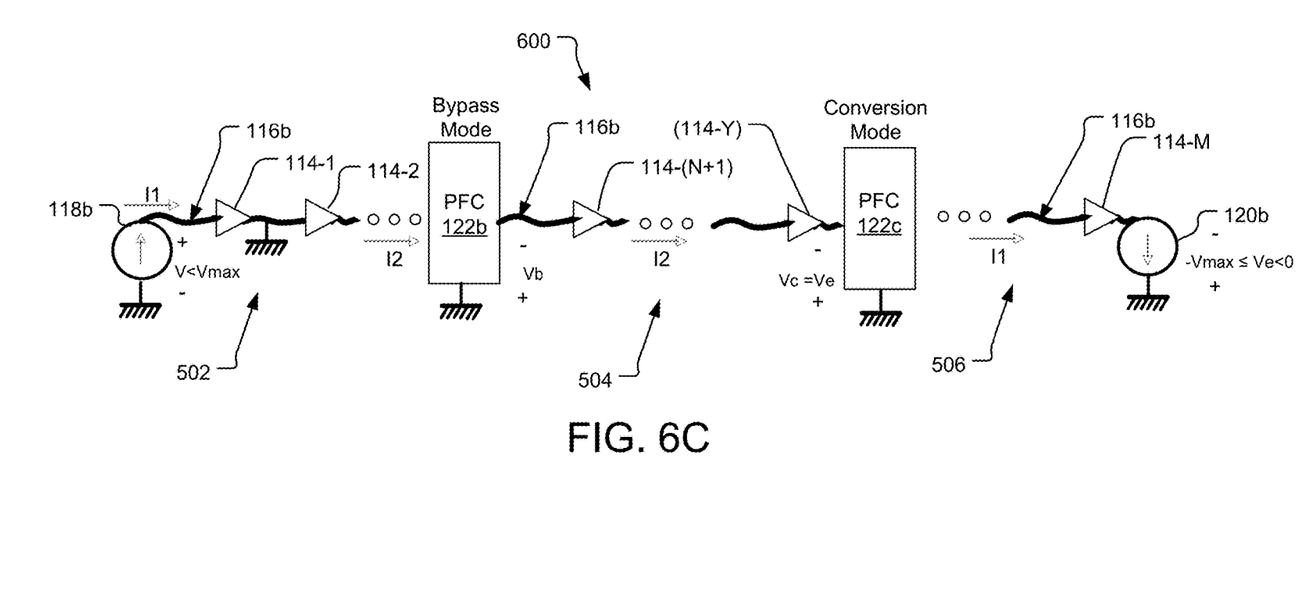

FIG. 6C illustrates operation of the system 600 in the event of shunt in the first section 502, i.e. between repeaters 114-1 and 114-2 in the illustrated embodiment. As shown, upon occurrence of a shunt in the first section 502, operation of the system to the left of the shunt continues as in normal operation of the system. In particular, the PFE118*b* establishes a constant current I1 in the first section 502 of the power conductor 116*b* and an input voltage V<Vmax. The current I1 is set to power all the repeaters in the first section 502 between the PFE 118*b* and the shunt.

The PFE120*b* establishes a constant current I1 in the third section 506 of the power conductor 116*b* and an input voltage −Vmax≤Ve. The current I1 is set to power all the repeaters in the third section 506. The PFC 122*c* is in conversion mode and is configured to receive input current I1 from the third section 506 and provide a constant current I2 in the second section 504. The current I2 from the PFC 122*c* is set to power all the repeaters in the second section 504. The PFC 122*b* senses a reduction in current received from the first section 502 and enters bypass mode. The current I2 from PFC 122*c* is established in the first section 502 and powers the repeaters in the first section 502 between the shunt and the PFC 122*b*. In the illustrated embodiment, the repeaters in the first section 502 between the shunt and the PFC 122*b*, which operate using I1 in FIGS. 6A and 6B are configured to operate using I2 in the case of a shunt in the first section 502 as shown in FIG. 6C.

Figure 6D:
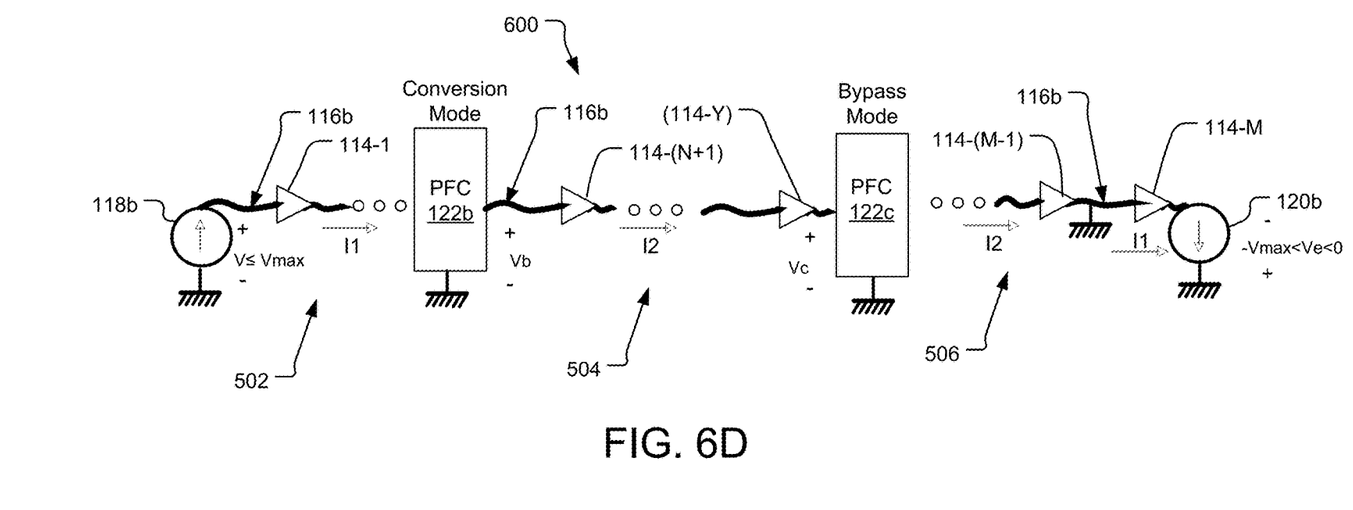

FIG. 6D illustrates operation of the system 600 in the event of shunt in the third section 506, i.e. between repeaters 114-(M−1) and 114-M in the illustrated embodiment. As shown, upon occurrence of a shunt in the third section 506, operation of the system to the right of the shunt continues as in normal operation of the system. In particular, the PFE120*b* establishes a constant current I1 in the third section 506 of the power conductor 116*b* and an input voltage −Vmax<Ve. The current I1 is set to power all the repeaters in the third section 506 between the PFE 120*b* and the shunt.

The PFE118*b* establishes a constant current I1 in the first section 502 of the power conductor 116*b* and an input voltage V≤Vmax. The current I1 is set to power all the repeaters in the first section 502. The PFC 122*b* is in conversion mode and is configured to receive input current I1 from the first section 502 and provide a constant current I2 in the second section 504. The current I2 from the PFC 122*b* is set to power all the repeaters in the second section 504. The PFC 122*c* senses a reduction in current received from the third section 506 and enters bypass mode. The current I2 from PFC 122*b* is established in the third section 506 and powers the repeaters in the third section 506 between the shunt and the PFC 122*c*. In the illustrated embodiment, the repeaters in the third section 506 between the shunt and the PFC 122*c*, which operate using I1 in FIGS. 6A and 6B are configured to operate using I2 in the case of a shunt in the third section 506 as shown in FIG. 6D.

Advantageously, the system 600 illustrated in FIGS. 6A-6D is robust to shunts of the power conductor 116*b* occurring anywhere along the length of the power conductor 116*b*. In normal operation and upon occurrence of a shunt, the PFE 118*b* and/or 120*b* both establish a constant current in the power conductor 116*b*. For shunt in the second section 504, both of the PFCS 122*b* and 122*c* continue to operate in a conversion mode. For a shunt in the first 502 or third 506 section, one of the PFCs 122*b* or 122*c* operates in conversion mode while the other of the PFCs operate in a bypass mode. As a result, all the repeaters coupled to the power conductor are powered by PFE 118*b* or PFE 120*b* in the event of a shunt of the power conductor 116*b*.

Figure 7:
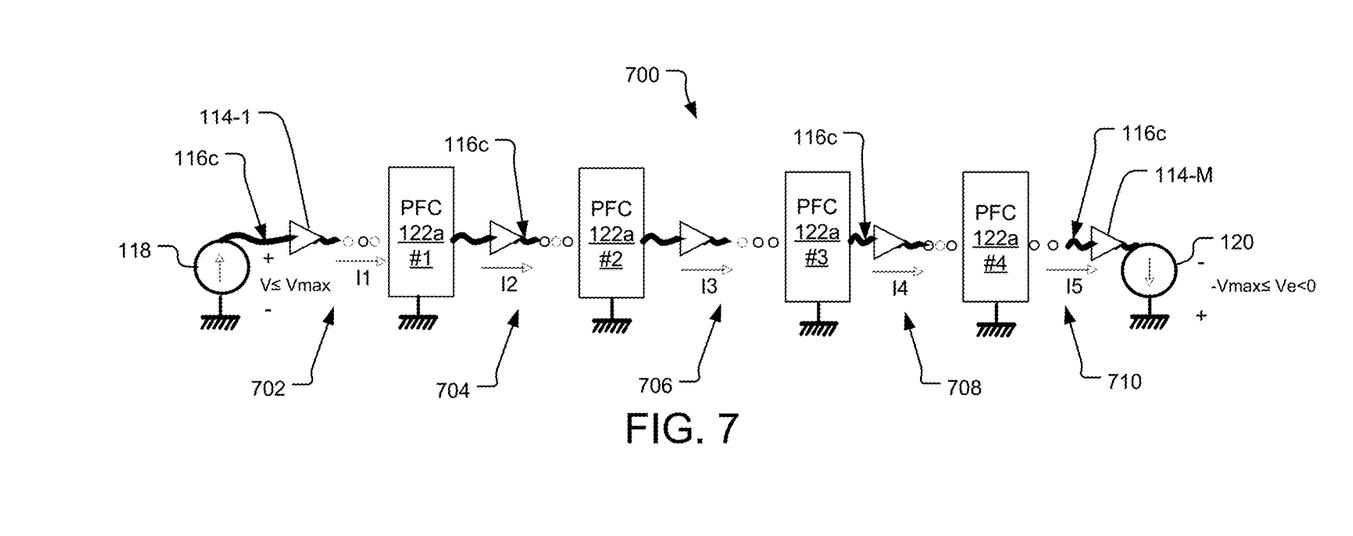
FIG. 7 diagrammatically illustrates another embodiment of a system consistent with the present disclosure.

Numerous other configurations will be apparent in light of the present disclosure. FIG. 7, for example, diagrammatically illustrates operation of another embodiment 700 of a dual-end feed power delivery configuration consistent with the present disclosure The embodiment 700 includes four PFCs 122*a* #1-4, a power conductor 116*c* and repeaters 114-1 . . . 114-M. The embodiment 700 includes PFE 118 coupled to the power conductor 116*c* to the left of PFC 122*a* #1 and PFE 120 coupled to the power conductor 116*c* to the right of PFC 122*a* #4. The PFE 118 and 120 are configured as constant current sources and are both in a current source mode during normal operation.

In the illustrated embodiment, the PFCs 122*a* #1-4 define five sections 702, 704, 706, 708 and 710 of the power conductor 116*c*. As shown, the PFE118 establishes a constant current I1 in the first section 702 of the power conductor 116*c* and an input voltage V≤Vmax. In some embodiments the input voltage is approximately equal to Vmax. The current I1 is set to power all the repeaters in the first section 702. The PFC 122*a* #1 is configured to receive input current I1 and provide a constant output current I2. The current I2 from the PFC 122*a* #1 is set to power all the repeaters in the second section 704. The PFC 122*a* #2 is configured to receive input current I2 and provide a constant output current I3. The current I3 from the PFC 122*a* #2 is set to power a portion of the repeaters in the third section 706.

The PFE120 establishes a constant current I5 in the fifth section 710 of the power conductor 116*c* and an input voltage −Vmax≤Ve. In some embodiments the input voltage Ve is approximately equal to −Vmax. The current I5 is set to power all the repeaters in the fifth section 710. The PFC 122*a* #4 is configured to receive input current I5 from the fifth section 710 and provide a constant current I4 in the fourth section 708. The PFC 122*a* #3 is configured to receive input current I4 from the fourth section 708 and provide a constant current I3 in the third section 706. The current I3 from the PFC 122*a* #3 is set to power the remaining repeaters in the third section 706 that are not powered by the current I3 from the PFC 122*a* #2. Somewhere in the third section 706, the voltage on the power conductor 116*c* is zero volts. Thus the illustrated embodiment 700 in a mirrored configuration, wherein the PFE 118 and PFC 122*a* #1-2 power all repeaters to the left of a zero voltage point on the power conductor 116*c* and the PFE 120 and PFC 122*a* #3-4 power all repeaters to the right of the zero voltage point on the power conductor 116*c*.

In some embodiments, the location of the PFCs 122*a* #1-4 may be optimized in the embodiment 700 to achieve maximum system reach. In one configuration, for example, the PFC 122*a* #1 and #4 may be about 0.0825 of total the length of the system from the PFE 118 and 120, respectively, and the PFC 122*a* #2 and #3 may be about 0.165 of the total length of the system from the PFE 118 and 120, respectively. In a system consistent with the present disclosure, however, the location of the converters can be adjusted to achieve desired system and performance characteristics.

According to one aspect of the disclosure there is thus provided a system for providing communications between communication devices located on different landmasses. The system includes a cable extending between a first landmass and a second landmass separated by a body of water, the cable comprising at least one data signal carrying line for carrying optical data signals between the first and second landmasses, the cable further comprising a power conductor having a first end on the first landmass and a second end on the second landmass; a plurality of repeaters coupled along the length of the cable between the first landmass and the second landmass for amplifying the optical data signals, each of the plurality of repeaters being electrically coupled to the power conductor; first power feed equipment located on the first landmass and electrically coupled to the first end of the power conductor; and at least one power feed converter electrically coupled to the power conductor, the power feed converted configured for receiving an input current from the first power feed equipment and providing a constant output current or voltage to the power conductor.

According to another aspect of the disclosure there is provided a system for providing communications between communication devices located on different landmasses. The system includes: a cable extending between a first landmass and a second landmass separated by a body of water, the cable comprising at least one data signal carrying line for carrying optical data signals between the first and second landmasses, the cable further comprising a power conductor having a first end on the first landmass and a second end on the second landmass; a number M of repeaters coupled along the length of the cable between the first landmass and the second landmass for amplifying the optical data signals, each of the plurality of repeaters being electrically coupled to the power conductor; first power feed equipment located on the first landmass and electrically coupled to the first end of the power conductor; second power feed equipment located on the second landmass and electrically coupled to the second end of the power conductor a first power feed converter electrically coupled to the power conductor with a second number N of the M repeaters coupled to power conductor between the first power feed equipment and the first power feed converter; and a second power feed converter electrically coupled to the power conductor with a third number Y of the M repeaters coupled between the first power feed equipment and the second power feed converter. Each of the first and second power feed converters is configured to operate in a conversion mode for converting an input current thereto to an associated constant output current or voltage coupled to the power conductor. At least one of the first and second power feed converters is configured to operate in a bypass mode upon occurrence of a shunt of the power conductor whereby the at least one first power feed converter or the second power feed converters passes input current thereto through to the power conductor without converting the input current into the associated constant output voltage or current.

According to another aspect of the disclosure there is provided a method of powering a plurality of repeaters coupled to an underwater cable extending between a first land mass and a second landmass, the cable including at least one optical fiber for carrying optical signals between the first and second landmasses and a power conductor electrically coupled the repeaters. The method includes: coupling first power feed equipment located on the first landmass to the power conductor; coupling a first power feed converter to the power conductor; establishing an input current from the first power feed equipment to power conductor to power a first number of the repeaters coupled to the power conductor between first power feed equipment and the first power feed converter; receiving the input current at the first power feed converter and converting the input current to a constant output voltage or current in the first power feed converter; and coupling the constant output voltage or current to the power conductor for powering a second number of the repeaters coupled to the power conductor between the first power feed converter and the second land mass.

It will be appreciated by those skilled in the art that any block diagrams herein represent conceptual views of illustrative circuitry embodying the principles of the disclosure. The functions of the various elements shown in the figures, including any functional blocks, may be provided through the use of dedicated hardware as well as hardware capable of executing software in association with appropriate software.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. As used herein, use of the term "nominal" or "nominally" when referring to an amount means a designated or theoretical amount that may vary from the actual amount. Unless otherwise stated, use of the word "substantially" or "approximately" may be construed to include a precise relationship, condition, arrangement, orientation, and/or other characteristic, and deviations thereof as understood by one of ordinary skill in the art, to the extent that such deviations do not materially affect the disclosed methods and systems.

Although the terms "first," "second," "third" etc. may be used to describe various elements, components and/or sections, these elements, components and/or sections are not to be limited by these terms as they are used only to distinguish one element, component or section from another element, component or section. Also, spatially relative terms, such as "left", "middle", "right" and the like may be used herein for ease of description to describe one element or feature's relationship to another element(s) or feature(s) as illustrated in the drawings. These spatially relative terms are intended to encompass different orientations of the system in use or operation in addition to the orientation shown in the drawings.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for providing communications between a first location and a second location, comprising:
   an optical cable configured to propagate optical data signals between the first location and the second location;
   a power conductor disposed within the optical cable, the power conductor having a first end at the first location and a second end at the second location;
   a plurality of repeaters coupled along the length of the optical cable for amplifying the optical data signals, each of the plurality of repeaters being electrically coupled to the power conductor; and
   at least one power feed converter electrically coupled to the power conductor, the power feed converter configured to receive an input current and provide a constant output current or voltage to the power conductor, and
   wherein the constant output current or voltage is configured to establish a voltage at the second end of the power conductor of approximately zero volts.

2. A system according to claim 1, the system further comprising first power feed equipment located at the first location and electrically coupled to the first end of the power conductor and second power feed equipment located at the second location and electrically coupled to the second end of the power conductor.

3. A system according to claim 2, the system further comprising:
   at least a second power feed converter electrically coupled to the power conductor, the second power feed converter configured for receiving an input current from the second power feed equipment and providing a second constant output current or voltage to the power conductor,
   wherein the constant output current or voltage and the second constant output current or voltage are configured to establish a voltage of zero volts on the power conductor between the at least one power feed converter and the at least a second power feed converter.

4. A system according to claim 3, the first power feed equipment is configured to establish a voltage on the power conductor that is approximately equal to a maximum cable voltage (Vmax) and the second power feed equipment is configured to establish a voltage on the power conductor that is approximately equal to −Vmax.

5. A system according to claim 1, wherein the at least one power feed converter comprises a first power feed converter and a second power feed converter.

6. A system according to claim 5, wherein at least one of the first power feed converter and the second power feed converter is configured to enter a bypass mode upon occurrence of a shunt of the power conductor whereby the first power feed converter or the second power feed converter passes an input current thereto through to the power conductor without converting the input current into a constant output current or voltage.

7. A system according to claim 6, the system further comprising first power feed equipment located at the first location and electrically coupled to the first end of the power conductor and second power feed equipment located at the second location and electrically coupled to the second end of the power conductor.

8. A system according to claim 7, wherein in the absence of a shunt of the power conductor, the second power feed equipment is not configured to establish a current on the power conductor and upon occurrence of a shunt in the power conductor the second power feed equipment is configured to establish a current on the power conductor.

9. A system according to claim 7, wherein in the absence of a shunt of the power conductor, the second power feed equipment is configured to establish a current on the power conductor.

10. A system for providing communications between a first location and a second location, comprising:
    an optical cable configured to propagate optical data signals between the first location and the second location;
    a power conductor disposed within the optical cable, the power conductor having a first end at the first location and a second end at the second location;
    a number M of repeaters coupled along the optical cable between the first location and the second location for amplifying the optical data signals, each of the plurality of repeaters being electrically coupled to the power conductor; and
    a first power feed converter electrically coupled to the power conductor with a second number N of the M repeaters;
    a second power feed converter electrically coupled to the power conductor with a third number Y of the M repeaters, and
    wherein each of the first and second power feed converters is configured to operate in a conversion mode for converting an input current to an associated constant output current or voltage coupled to the power conductor, and
    wherein at least one of the first and second power feed converters is configured to operate in a bypass mode upon occurrence of a shunt of the power conductor such that the at least one first power feed converter or the second power feed converter passes input current through to the power conductor without converting the input current into the associated constant output voltage or current.

11. A system according to claim 10, wherein the ratio of N/M is between 0.3 and 0.35.

12. A system according to claim 10, wherein the ratio of (M−Y)/M is between 0.3 and 0.35.

13. A system according to claim 10, further comprising:
    first power feed equipment located on the first location and electrically coupled to the first end of the power conductor and second power feed equipment located on the second location and electrically coupled to the second end of the power conductor, wherein in the absence of a shunt of the power conductor the second power feed equipment is not configured to establish a current on the power conductor, and upon occurrence of a shunt in the power conductor the second power feed equipment is configured to establish a current on the power conductor.

14. A system according to claim 10, further comprising:
    first power feed equipment located on the first location and electrically coupled to the first end of the power conductor and second power feed equipment located on the second location and electrically coupled to the second end of the power conductor, wherein in the absence of a shunt of the power conductor, the second power feed equipment is configured to establish a current on the power conductor.

15. A method of powering a plurality of repeaters coupled to an optical cable between a first location and a second location, the optical cable configured to propagate optical signals between the first and second locations, and a power conductor electrically coupled to the plurality of repeaters, the method comprising:

- coupling a first power feed converter to the power conductor;
- establishing an input current to power a first number of the repeaters coupled to the power conductor;
- receiving the input current at the first power feed converter and converting the input current to a constant output voltage or current in the first power feed converter; and
- coupling the constant output voltage or current to the power conductor for powering a second number of the repeaters coupled to the power conductor, and
- wherein the constant output current or voltage is configured to establish a voltage at an end of the optical cable at the second location of approximately zero volts.

16. A method according to claim 15, the method further comprising:

- coupling first power feed equipment located on the first location to the power conductor;
- coupling second power feed equipment located on the second location to the power conductor;
- coupling a second power feed converter to the power conductor;
- establishing a second input current from the second power feed equipment to the power conductor to power a third number of the repeaters coupled to the power conductor between second power feed equipment and the second power feed converter;
- receiving the second input current at the second power feed converter and converting the second input current to a second constant output voltage or current in the second power feed converter; and
- coupling the second constant output voltage or current to the power conductor for powering a fourth number of the repeaters coupled to the power conductor between the second power feed converter and the first power feed converter.

17. A method according to claim 16, wherein the constant output voltage or current and the second constant output voltage are configured to establish a voltage on the power conductor between the first power feed converter and the second power feed converter of zero volts.

18. A method according to claim 17, the method further comprising:

- establishing an output voltage on the power conductor from the first power feed equipment that is approximately equal to a maximum cable voltage (Vmax); and
- establishing an output voltage on the power conductor from the second power feed equipment that is approximately equal to −Vmax.

19. A method according to claim 16, the method further comprising: configuring at least one of the first power feed converter or the second power feed converter to enter a bypass mode upon occurrence of a shunt of the power conductor whereby the at least one of the first power feed converter or the second power feed converter passes input current thereto through to the power conductor without conversion.

* * * * *